United States Patent [19]

Lilienthal et al.

[11] Patent Number: 4,929,017
[45] Date of Patent: May 29, 1990

[54] ARMREST FOR VEHICLES AND METHOD OF MAKING SAME

[75] Inventors: Cal A. Lilienthal; Ronald L. Christensen, both of Iowa City, Iowa

[73] Assignee: Purethane Incorporated, West Branch, Iowa

[21] Appl. No.: 263,880

[22] Filed: Oct. 28, 1988

[51] Int. Cl.$^5$ .............................. B60N 1/02
[52] U.S. Cl. .................... 296/153; 264/46.6
[58] Field of Search ............ 296/153; 280/751; 16/110 R; 264/46.6

[56] References Cited

U.S. PATENT DOCUMENTS

| | | | |
|---|---|---|---|
| 3,387,881 | 6/1968 | Stepanek et al. | 296/153 |
| 3,620,566 | 11/1971 | Leconte | 296/153 |
| 4,165,898 | 8/1976 | Janz et al. | 296/153 |
| 4,226,464 | 10/1980 | Janz et al. | 296/153 |
| 4,667,979 | 5/1987 | Wolff | 296/153 |

Primary Examiner—Robert R. Song
Attorney, Agent, or Firm—James C. Nemmers

[57] ABSTRACT

An improved armrest used in vehicles where the armrest is affixed to the vehicle door and also serves as a grab-handle to enable the passenger to pull the door closed. The improved armrest is of the type that is produced by an injection molded vinyl process, and the armrest uses a two-piece insert in the main body that allows foam to be introduced into the upper portion and inboard side where the user's arm rests. This produces a more comfortable armrest that also is more visually pleasing and one that can be produced at a lower cost than known armrests of this type.

4 Claims, 1 Drawing Sheet

U.S. Patent May 29, 1990 4,929,017
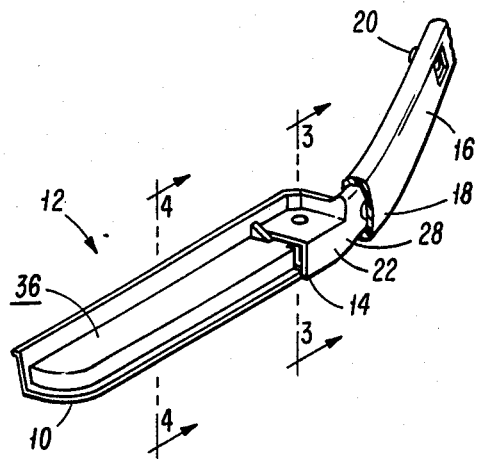
FIG 1
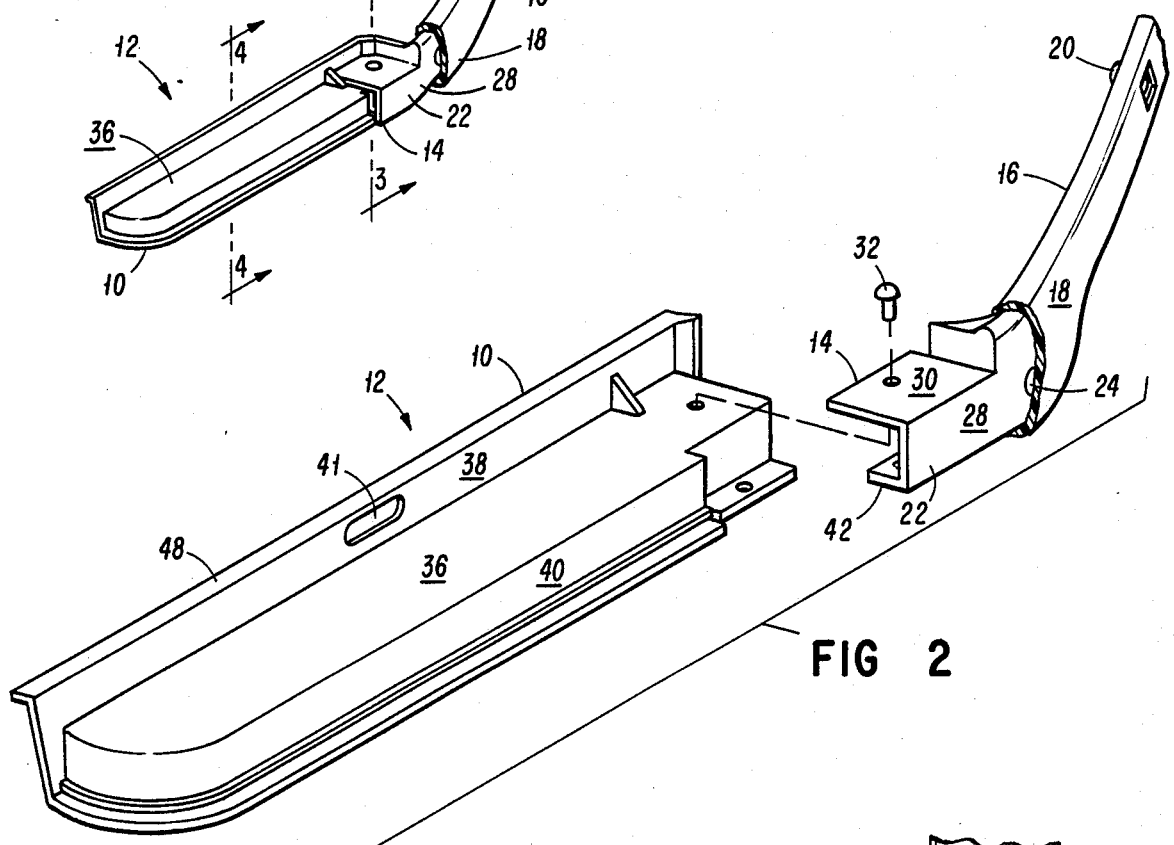
FIG 2
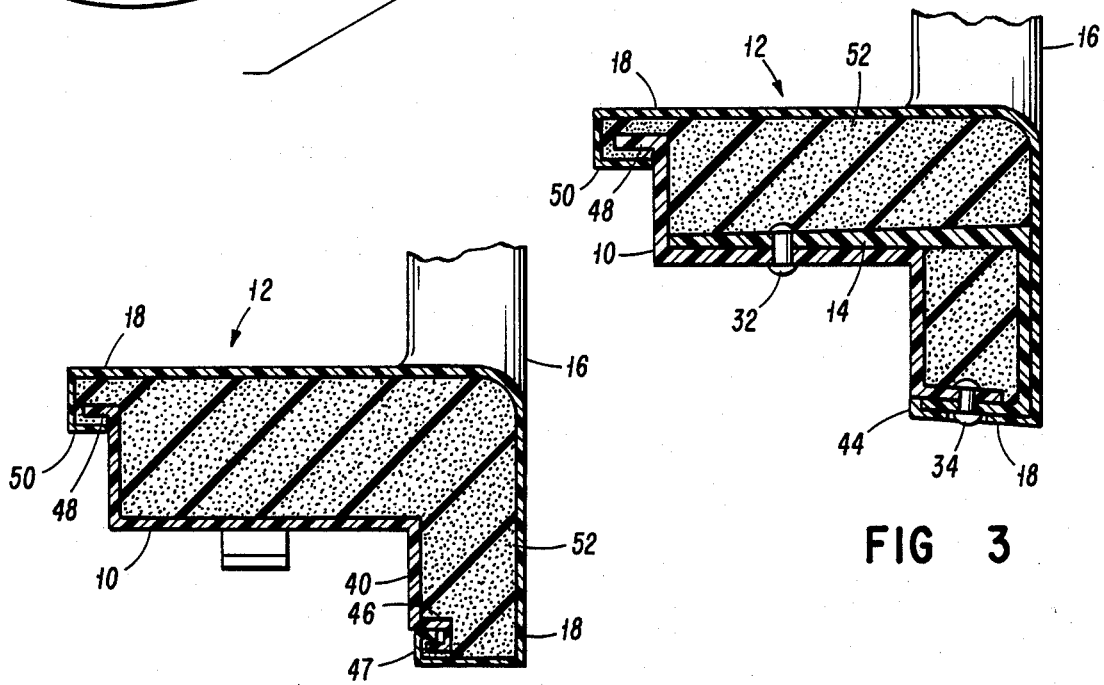
FIG 3
FIG 4

ARMREST FOR VEHICLES AND METHOD OF MAKING SAME

BACKGROUND OF THE INVENTION

In recent times, the interior or passenger compartment of passenger vehicles has been designed to make the compartment as safe as possible for the occupants, especially in the event of a collision. In an effort to make the passenger compartment as safe as possible, designers have attempted to eliminate as much as possible, protruding knobs, handles, levers, etc. In many instances, operating knobs have been replaced with touch switches or the knobs have been recessed. Handles to operate the latch on the doors have been recessed, and in so doing, it frequency has been necessary to make other provisions for a handle that the occupant can grasp to pull the door closed. Also, in recent years, as an aid to the comfort of the passengers, armrests have been provided on the door. The most recent designs have combined the armrest and a grab handle into a single component that is firmly affixed to the door and serves the function of providing a comfortable armrest while at the same time providing a strong handle that the user can grasp to pull the door closed. Of course, these grab-handle armrests have also been designed to be aesthetically pleasing as well as safe with no sharp edges or protruding components that could in any way contribute to the injury of a passenger.

In order to make the grab-handle armrest functional, safe and aesthetically pleasing, these units are commonly made with a rigid insert that provides the strength for the grab handle and also allows the unit to be securely affixed to the door. The insert is then covered with a foam and a soft but durable skin of vinyl material matched to the decor of the interior passenger compartment. Commonly, the insert includes a back plate that serves to contain the foam and hold the soft vinyl skin in place when the unit is affixed to the vehicle door. The present method for producing the grab-handle armrest is to first prepare the rigid insert, which is commonly made of somewhat rigid plastic, in a single piece shaped to provide a skeleton for the necessary strength for the grab-handle armrest. The insert is then placed in a mold and covered with vinyl using an injection molded process. The partially formed part is then removed and placed in a separate mold where the empty space around the armrest portion is foamed. Because of the process, no foam reaches the inboard side of the armrest. This commonly-used process produces a satisfactory grab-handle armrest, but the inboard side of the armrest, being covered only with the vinyl skin, presents a hard surface to the passenger. Also, the transition from the hard inboard side to the softer foam covered top surface creates a visible transitional line which some vehicle manufacturers find objectionable. Moreover, the insert is not a precision molded component and therefore the inserts will vary slightly in size. This somewhat large tolerance in size must be allowed for in the injection mold where the vinyl skin is formed. The space created by the extra tolerance in the injection mold is therefore filled with vinyl, and the present process thus requires a relatively large amount of vinyl material to both cover the insert and produce the desired exterior configuration. Also, although the vinyl is somewhat soft, the inboard surface is not as comfortable as it could be if the armrest contained vinyl-covered foam over the inboard side.

The cost of even a single component in passenger vehicles can be critical, and even a slight reduction in cost of a single component is highly desirable. Therefore, if the more expensive vinyl could be replaced with less expensive foam, the cost saving would be worthwhile. Moreover, as manufacturers strive to increase the quality of not only mechanical components but also of the fit and finish of their products, components that were once acceptable may no longer be acceptable even if the appearance and quality are slightly improved. As manufacturers of vehicles become more competitive and consumers more critical of quality and price, there is a need for improvement in any and all vehicle components in quality, function and appearance as well as a need for cost reduction.

SUMMARY OF THE INVENTION

The grab-handle armrest of the invention utilizes a two-piece insert which also serves as the back plate. The use of the two-piece insert provides for an armrest having a urethane foam interior covering not only the top of the armrest but also its inboard surface. The foam is then covered with a layer of vinyl that is sufficiently thick to be durable for the useful life of the vehicle, the vinyl being bonded to the urethane foam interior covering the insert. Also, the specific design of the two-piece insert allow the edges of the vinyl skin to be returned over the insert, locking the skin in place and resulting in a more durable product and one in which it is less likely that the vinyl will separate from the armrest once installed on the door. The method of the invention used to make the improved grab-handle armrest is a basic injection molded vinyl process in which a moveable half or core half of the mold is used together with the grab handle portion of the insert, with the vinyl skin being formed over them. The partially formed part is then removed from the injection mold and the second part of the insert is assembled to it. This assembly is then placed in a foaming mold and the urethane foam injected into the remaining spaces between the vinyl skin and the insert. The foam extends not only over the top surface of the armrest but also along the inboard side.

BRIEF DESCRIPTION OF THE DRAWINGS

FIG. 1 is a perspective view of a partially completely grab-handle armrest and showing the vinyl skin broken away from the armrest portion to show the two pieces of the insert assembled;

FIG. 2 is a sectional view of the armrest showing the two insert pieces separated;

FIG. 3 is a sectional view of a completed armrest taken on the line 3—3 of FIG. 1; and FIG. 4 is a sectional view of a completed armrest taken on the line 4—4 of FIG. 1.

DESCRIPTION OF THE PREFERRED EMBODIMENT OF THE INVENTION

In its completed form, the grab-handle armrest of the invention includes an insert 10 for the armrest portion 12 that is affixed to the insert 14 for the grab-handle portion 16. A vinyl covering 18 covers the inserts 10 and 14 and the foamed interior that is formed around the inserts 10 and 14. In its completed form and when installed on a vehicle door, the product appears to be a unitary product that consists of the armrest 12 and the grab-handle 16 both covered by a continuous unbroken layer of vinyl covering 18.

The upper portion of the insert 14 for the grab-handle 16 is basically shaped to the configuration of the finished product, this portion of insert 14 being covered with the vinyl skin 18 with no foam cushion over the insert. Insert 14 also includes a reinforced portion 20 near the upper end that accommodates a suitable fastener (not shown) for attachment of the grab-handle portion 16 to the door of a vehicle in a well known manner. The lower portion 22 of the insert 14 also includes a reinforced portion with an opening 24 that accommodates a fastener (not shown) for attachment of the grab-handle portion 16 to a vehicle door. The lower portion 22 also contains an inner wall 28 that defines the shape of the completed product at the lower portion of the grab-handle 16 and also provides an aesthetic transition from the grab-handle portion 16 to the armrest 12. Lower portion 22 of insert 14 also includes an outwardly extending horizontal wall 30 that is spaced vertically from the top of the armrest 12. Wall 30 provides a means of attaching the armrest insert 10 to the grab-handle insert 14 using fasteners 32 and 34. Wall 30 thus forms a part of the insert for the finished armrest in the completed product.

The insert 10 for the armrest 12 includes a longitudinally extending horizontal member 36 formed integrally with a vertically extending outboard wall 38 and a vertically extending inboard wall 40. The inboard wall 40 is curved inwardly at its terminal end so as to meet with outboard wall 38. This forms the terminal end of the completed armrest. The outboard wall 38 also serves the function of a back plate which contains the foam and provides a more durable finished product. Since outboard wall 38 is formed integrally with the insert 10, this eliminates the necessity for a separate back plate component. Outboard wall 38 has an elongated opening 41 that serves as a pour hole for the urethane foam that fills the interior of the armrest portion 12. Obviously, specific attachment means (not shown) for attaching the armrest to the vehicle may also be formed on the inserts 10 and 14, and the particular means will vary depending upon the design of the vehicle door. Also, the specific configuration of the inserts 10 and 12 will vary depending upon design of the armrest and the requirements and specifications of the vehicle manufacturer. The principles of the invention, however, are applicable to all different configurations.

As best seen in FIG. 2, the lower end of the grab-handle insert 14 is provided with an outwardly extending portion 42 which provides for attachment of insert 14 to the insert 10 using fastener 34. Also, when the inserts 10 and 12 are assembled, a notch is provided into which the edges of the vinyl skin 18 can be returned as shown at 44 of FIG. 3. This minimizes the possibility of the vinyl skin 18 becoming separated from the inserts 10 and 12, especially after the armrest is installed on the vehicle door. Similarly, the inboard wall 40 of insert 10 is provided with an inwardly extending portion 46 that forms a notch into which the edge of the vinyl skin 18 can be returned as shown at 47 of FIG. 4.

Similiar provision is made for return of the vinyl skin 18 over the insert 10 as best seen in FIGS. 3 and 4. Insert 10 has formed on its outboard wall 38 an outwardly extending portion 48 that allows for the skin return as shown at 50 in both FIGS. 3 and 4.

Obviously, there is a considerable space between the inboard wall 40 of insert 10 and the vinyl skin 18 and between the horizontal member 36 and the vinyl skin 18. This space is filled with urethane foam 52 which is injected into the space and allowed to expand and bond to the inner surface of the vinyl skin 18 and the surfaces of the inserts 10 and 14. This construction not only provides a structurally strong finished product but also provides an armrest portion 12 that is soft and comfortable on the top where the user's arm rests on the inboard side. Also, the finished product has no exteriorly visible transition or witness lines which are considered aesthetically undesirable. The completed armrest thus is aesthetically pleasing since the urethane 52 foam will expand to form a wrinkle-free vinyl skin 18 which was previously molded to the desired final configuration. In order to produce the finished product, a standard injection-molded-vinyl process is modified according to the following steps. Insert 14 for the grab-handle portion 16 is placed in a mold which has been formed to the desired final exterior. configuration, as is well known to those skilled in the art. The moveable half or core half (not shown) of the mold is placed in the mold along with insert 14 so that the vinyl skin for the armrest portion 12 will be formed with the desired thickness. Similarly, the size, configuration and position of the insert 14 is such that the vinyl skin of the desired thickness will be formed around the grab-handle portion 16. FIG. 1 best illustrates the partially finished product at this stage of the process with part of the vinyl skin over the armrest portion broken away. At this stage in the process, the grab-handle portion 16 is in its final condition, but the armrest portion 12 has only the vinyl skin 18 formed, which is continuous and unbroken with the skin 18 over the grab-handle portion 16. After the part is removed from the injection mold the insert 10 for the armrest portion 12 is then assembled to the lower portion 22 of insert 14 by use of fasteners 32 and 34. With the assembly now properly positioned in a foam mold, urethane foam 52 is then injected into the space between the inserts 10 and 12 and the pre-formed vinyl skin 18. The foam 52 will expand to fill the space and will bond to both the interior surface of the vinyl skin 18 and the surfaces of inserts 10 and 14. the finished article is then removed from the mold.

By using the foregoing described process of the invention, savings in both labor and material can be achieved. Because the inserts used in the injection-molded process are not made to very close tolerances, the dimensional variations in the inserts are compensated for in prior art methods when the vinyl is molded around the insert. This usually requires more vinyl, since a minimum thickness of vinyl is usually required and the tolerance variation in the insert is filled with extra vinyl. But with the process of the invention, the vinyl skin can be molded with a uniform thickness, by using the removable core half of the mold which is made to a close tolerance. Dimensional variations in the insert are then filled with foam, a much less costly material than vinyl. Labor savings is achieved using the process of the invention because it is easier and quicker to place the unit on and remove it from the core of the skin mold.

The process of the invention also allows the insert to serve as a backplate which provides a product that looks more finished and has less foam exposed to view and to possible damage during handling and assembly. Use of urethane foam also provides a finished product that is more aesthetically pleasing in that "witness lines" necessarily produced in forming a grab-handle armrest with vinyl only over an insert are eliminated. In other words, because there is always foam between the insert and vinyl skin, it is impossible to "read" the insert through the skin of the finished part. Moreover, the extra foam on the inboard side of the armrest that is made possible by the invention provides additional energy absorbtion so as to reduce any discomfort to a passenger in the event the passenger is bumped against the armrest.

Obviously, the method of the invention and the resulting product utilizing a two-piece insert with a vinyl skin and urethane foam combination can be used to make a variety of products. The invention is applicable to almost any product in which a part or all of the finished product is encapsulated with a vinyl skin. The specific configuration of the completed product and the inserts themselves will, of course, depend upon the specifications of the manufacturer. However, the process produces a superior product, and when used for vehicle armrests the process and the product produced by it are applicable to almost any grab-handle type armrest. In addition, the two-piece insert design of the invention gives the designer greater flexibility in determining methods of attaching the armrest because the unit can be designed with different lines of draw. This can result in additional cost savings. Therefore, it will be obvious to those skilled in the art that various revisions and modifications can be made in the product and the method described herein without departing from the spirit and scope of the invention. It is our intention however that all such revisions and modifications as are obvious to those skilled in the art will be included within the scope of the following claims.

What is claimed is as follows:

1. A grab-handle armrest unit for a vehicle door and having an outboard side engageable with the door when the unit is affixed to it and an inboard side facing away from the door, said unit comprising a structural insert of generally rigid material, the insert including a grab-handle portion and an armrest portion separable from the grab-handle portion, a vinyl skin covering the unit on all surfaces except that portion of the outboard side that engages the vehicle door, urethane foam filling all spaces in the unit between the insert and the vinyl skin, the grab-handle portion of the unit being covered only with vinyl, and the urethane foam filling the unit along the inboard side and top of the armrest to provide cushioned surfaces.

2. The grab-handle armrest unit of claim 1 in which the outboard edges of the armrest portion of the insert are formed with ledges extending along them to provide for return of the vinyl skin beneath them.

3. The grab-handle armrest unit of claim 1 in which the armrest portion of the insert includes a vertical wall extending along substantially the entire length of the armrest to provide a backplate so as to contain the urethane foam.

4. The grab-handle armrest unit of claim 1 in which the insert portions are fastened together to form a single rigid structural support.

* * * * *